(12) United States Patent
Granström et al.

(10) Patent No.: US 8,884,003 B2
(45) Date of Patent: Nov. 11, 2014

(54) METHOD OF CHLORINATING POLYSACCHARIDES OR OLIGOSACCHARIDES

(75) Inventors: Mari Granström, Mannheim (DE); Werner Mormann, Kreuztal (DE); Petra Frank, Kreuztal (DE)

(73) Assignee: BASF SE, Ludwigshafen (DE)

( * ) Notice: Subject to any disclaimer, the term of this patent is extended or adjusted under 35 U.S.C. 154(b) by 395 days.

(21) Appl. No.: 13/004,516

(22) Filed: Jan. 11, 2011

(65) Prior Publication Data

US 2011/0175023 A1     Jul. 21, 2011

Related U.S. Application Data

(60) Provisional application No. 61/295,192, filed on Jan. 15, 2010.

(51) Int. Cl.
*C08B 15/00* (2006.01)
*C08B 1/00* (2006.01)

(52) U.S. Cl.
CPC .. *C08B 15/00* (2013.01); *C08B 1/00* (2013.01)
USPC .............................. 536/124; 536/56; 536/122

(58) Field of Classification Search
USPC ........................................... 536/56, 122, 124
See application file for complete search history.

(56) References Cited

U.S. PATENT DOCUMENTS

| | | | |
|---|---|---|---|
| 6,808,557 | B2 | 10/2004 | Holbrey et al. |
| 6,824,599 | B2 | 11/2004 | Swatloski et al. |
| 2008/0028777 | A1 | 2/2008 | Boesmann et al. |
| 2008/0269477 | A1 | 10/2008 | Stegmann et al. |
| 2009/0020112 | A1 | 1/2009 | Massonne et al. |
| 2009/0062524 | A1 | 3/2009 | Massonne et al. |
| 2009/0182138 | A1 | 7/2009 | Massonne et al. |
| 2011/0175023 | A1 | 7/2011 | Granstrom et al. |

FOREIGN PATENT DOCUMENTS

| | | |
|---|---|---|
| GB | 1449891 | 9/1976 |
| GB | 2451046 A | 1/2009 |
| WO | WO-03/029329 A2 | 4/2003 |
| WO | WO-2005/113702 A1 | 12/2005 |
| WO | WO-2006/000197 A1 | 1/2006 |
| WO | WO-2007/076979 A1 | 7/2007 |
| WO | WO-2007/101811 A1 | 9/2007 |
| WO | WO-2007/101812 A1 | 9/2007 |
| WO | WO-2007/101813 A1 | 9/2007 |
| WO | WO-2007/128268 A2 | 11/2007 |
| WO | WO-2008/000666 A1 | 1/2008 |
| WO | WO-2008/043837 A1 | 4/2008 |
| WO | WO-2011/086082 | 7/2011 |

OTHER PUBLICATIONS

Zhao et al., "Synthesis and Characterization of Ionic Liquids Incorporating the Nitrile Functionality", Inorg. Chem., 2004, 43, p. 2197-2205.*
Heinze et al., "Ionic Liquids as Reaction Medium in Cellulose Functionalization", Macromol. Biosci., 2005, 5, p. 520-525.*
Boehm, R.L., "Chlorination of Cellulose with Thionyl Chloride in a Pyridine Medium", J. Org. Chem., 1958, 23(11), p. 1716-1720.*
Pinkert et al., Chemical Reviews, 2009, 109(12), p. 6712-6728.*
March, J., Advanced Organic Chemistry: reactions, mechanism, and stucture, 1992, Wiley-Interscience, 4th ed., p. 357-362.*
"An Improved Procedure for the Preparation of Chlorinated Cellulose with Methanesulfonyl Chloride in a Dimethylformamide-Chloral-Pyridine Mixture," *Journal of Polymer Science: Part A: Polymer Chemistry*, (1990), vol. 28, pp. 2223-2227.
Furuhata, K., et al., "Chlorination of cellulose with N-chlorosuccinimide-triphenylphosphine under homogeneous conditions in lithium chloride-N,N-dimethylacetamide," *Carbohydrate Research*, (1992), vol. 230, pp. 151-164.
How, T., et al., "Chlorination of chitin with sulfuryl chloride under homogeneous conditions," *Carbohydrate Polymers*, (1997), vol. 33, pp. 13-18.
Sakamoto, M., at al., "Regioselective chlorination of chitin with N-chlorosuccinimide-triphenylphosphine under homogeneous conditions in lithium chloride-N,N-dimethylacetamide," *Carbohydrate Research*, (1994), vol. 265, pp. 271-280.
International Search Report from PCT/EP2011/050305 dated May 26, 2011.

* cited by examiner

*Primary Examiner* — Eric Olson
*Assistant Examiner* — Jonathan S Lau
(74) *Attorney, Agent, or Firm* — Drinker Biddle & Reath LLP

(57) ABSTRACT

A process for chlorinating polysaccharides or oligosaccharides, which comprises
A) dissolving a polysaccharide or oligosaccharide in a solvent system which comprises at least one ionic liquid and
B) reacting the polysaccharides or oligosaccharides with a chlorinating agent.

10 Claims, No Drawings

METHOD OF CHLORINATING POLYSACCHARIDES OR OLIGOSACCHARIDES

CROSS-REFERENCE TO RELATED APPLICATIONS

This application claims benefit of U.S. Provisional Application 61/295,192, filed Jan. 15, 2010.

BACKGROUND OF THE INVENTION

The present invention describes a process for chlorinating polysaccharides or oligosaccharides, which comprises
A) dissolving a polysaccharide or oligosaccharide in a solvent system which comprises at least one ionic liquid and
B) reacting the polysaccharides or oligosaccharides with a chlorinating agent.

Cellulose is the most important renewable raw material and represents an important starting material for, for example, the textile and paper and nonwovens industries. It also serves as raw material for cellulose derivatives and modification methods and processes, including cellulose ethers and cellulose esters. These derivatives and modifications have several uses, for example in the textile, food, building and surface coating industries. Therefore there is a particular interest in processes by which cellulose may by modified and also in modified cellulose for various technical applications.

In addition, cellulose or modified cellulose of low molecular weight which corresponds to a low degree of polymerization (DP) is required in many technical applications.

Processes for the degradation of cellulose which result in cellulose with a low DP are known from WO 2007/101811 (degradation by the use of acid), WO 2007/101812 (degradation at elevated temperatures) and WO 2007/101813 (degradation by nucleophiles).

In WO 2008/000666 acylation and degradation of cellulose in ionic liquids is described. The process, however, is a two step process. In a first step the DP of the cellulose is lowered according to the teachings of WO 2007/101811 or WO 2007/101812 and in a second step the obtained low molecular weight cellulose is acylated.

There is therefore a need to provide a simple process for the modification and degradation of polysaccharides or oligosaccharides, in particular for cellulose.

BRIEF SUMMARY OF THE INVENTION

The present invention relates to a process for chlorinating polysaccharides or oligosaccharides, which comprises
A) dissolving a polysaccharide or oligosaccharide in a solvent system which comprises at least one ionic liquid and
B) reacting the polysaccharides or oligosaccharides with a chlorinating agent.

We have now found an easy process for preparing chlorinated polysaccharides or oligosaccharides; furthermore we have found a process for the chlorination and degradation of polysaccharides or oligosaccharides.

DETAILED DESCRIPTION OF THE INVENTION

To step A)

In step A) of the process a polysaccharide or oligosaccharide is dissolved in a solvent system which comprises at least one ionic liquid.

To the Polysaccharide

Examples of polysaccharides or oligosaccharides include cellulose, and hemicellulose and also starch, glycogen, dextran and tunicin. Further examples are the polycondensates of D-fructose, e.g. inulin, and also, inter alia, chitin, and alginic acid. The polysaccharides or oligosaccharides, in particular cellulose, may to some extent be chemically modified, for example by etherification or esterification of hydroxyl groups.

Preferably the polysaccharide or oligosaccharide is cellulose, hemicellulose or chemically modified cellulose.

In a more preferred embodiment of the invention cellulose is used as polysaccharide. Most preferably the cellulose used is unmodified.

Preferred poly- or oligosaccharides, in particular cellulose, used for the process have a degree of polymerization (DP) of at least 50, more preferably of at least 150 or most preferred of at least 300. The maximum DP may, for example, be 1000, more preferably 800 or at maximum 600.

The degree of polymerization (DP) is the number of repeat units in an average polymer chain. DP can be calculated as follows: DP=Total Mw of the polymer/Mw of the repeating unit. The molecular weight is the weight average molecular weight. DP can be measured by Gel Permeable Chromatography (GPC) or Size Exclusion Chromatography (SEC).

To the Solvent System and Ionic Liquid

The solvent system may be one solvent or a mixture of solvents. The solvent system might be an ionic liquid, only, or a mixture of different ionic liquids or a mixture of ionic liquids and other organic, non-ionic solvents.

As non-ionic solvents polar solvents which can be mixed homogeneously with ionic liquids and do not lead to precipitation of the polysaccharide may be used, for example ethers or ketons, for example dioxane, dimethyl sulfoxide, dimethylformamide, dimethyllacetamide or sulfolane. Preferred is dioxane.

The content of ionic liquids in the solvent system is preferably at least 20% by weight, more preferably at least 50% by weight and most preferably at least 80% or 90% by weight.

In one preferred embodiment of the invention the solvent system is a mixture comprising one or more ionic liquids and at least one non ionic solvent, in particular dioxane. In such mixture the content of ionic liquids is preferably from 20 to 90% by weight, the reminder being the non-ionic solvent or solvents.

The solvent system preferably has no content or only a low content of water of below 5% by weight. In particular the content of water is below 2% by weight.

The term ionic liquid refers to salts (compounds composed of cations and anions) which at atmospheric pressure (1 bar) have a melting point of less than 200° C., preferably less than 150° C., particularly preferably less than 100° C. and very particularly preferably less than 80° C.

In a particularly preferred embodiment, the ionic liquids are liquid under normal conditions (1 bar, 21° C.), i.e. at room temperature.

Preferred ionic liquids comprise an organic compound as cation (organic cation). Depending on the valence of the anion, the ionic liquid can comprise further cations, including metal cations, in addition to the organic cation.

The cations of particularly preferred ionic liquids are exclusively an organic cation or, in the case of polyvalent anions, a mixture of different organic cations.

Suitable organic cations are, in particular, organic compounds having heteroatoms such as nitrogen, sulfur, oxygen or phosphorus; in particular, the organic cations are compounds having an ammonium group (ammonium cations), an oxonium group (oxonium cations), a sulfonium group (sulfonium cations) or a phosphonium group (phosphonium cations).

In a particular embodiment, the organic cations of the ionic liquid are ammonium cations, which for the present purposes are non aromatic compounds having a localized positive charge on the nitrogen atom, e.g. compounds comprising tetravalent nitrogen (quaternary ammonium compounds) or compounds comprising trivalent nitrogen, with one bond being a double bond, or aromatic compounds having a delocalized positive charge and at least one nitrogen atom, preferably one or two nitrogen atoms, in the aromatic ring system.

Preferred organic cations are quaternary ammonium cations which preferably have three or four aliphatic substituents, particularly preferably C1-C12-alkyl groups, which may optionally be substituted by hydroxyl groups, on the nitrogen atoms.

Particular preference is given to organic cations which comprise a heterocyclic ring system having one or two nitrogen atoms as constituent of the ring system. Monocyclic, bicyclic, aromatic or nonaromatic ring systems are possible. Mention may be made of, for example, bicyclic systems as are described in WO 2008/043837. The bicyclic systems of WO 2008/043837 are diazabicyclo derivatives, preferably made up of a 7-membered ring and a 6-membered ring, which comprise an amidinium group; particular mention may be made of the 1,8-diazabicyclo[5.4.0]undec-7-enium cation.

Very particularly preferred organic cations comprise a five- or six-membered heterocyclic ring system having one or two nitrogen atoms as constituent of the ring system.

Possible organic cations of this type are, for example, pyridinium cations, pyridazinium cations, pyrimidinium cations, pyrazinium cations, imidazolium cations, pyrazolium cations, pyrazolinium cations, imidazolinium cations, thiazolium cations, triazolium cations, pyrrolidinium cations and imidazolidinium cations. These cations are, for example, mentioned in WO 2005/113702. The nitrogen atoms of the cations are substituted by hydrogen or an organic group which generally has not more than 20 carbon atoms, preferably a hydrocarbon group, in particular a C1-C16-alkyl group, in particular a C1-C10-alkyl group, particularly preferably a C1-C4-alkyl group, if such substitution is necessary to have a positive charge.

The carbon atoms of the ring system can also be substituted by organic groups which generally have not more than 20 carbon atoms, preferably a hydrocarbon group, in particular a C1-C16-alkyl group, in particular a C1-C10-alkyl group, particularly preferably a C1-C4-alkyl group.

Particularly preferred ammonium cations are quaternary ammonium cations, imidazolium cations, pyrimidinium cations and pyrazolium cations.

Particular reference is given to imidazolium cations of formula I

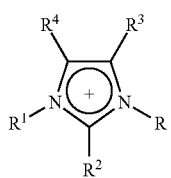

pyridinium cations of formula II

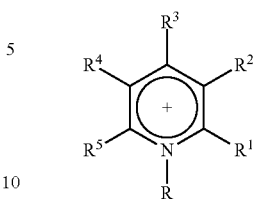

and pyrazolium cations of formula III

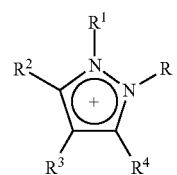

where the radicals have the following meaning:
R is an organic group with 1 to 20 carbon atoms and
R1 to R5 are, independently from each other, a hydrogen atom or an organic group with 1 to 20 carbon atoms, in case of imidazolium (formula I) and pyrazolium cations (formula Iii), R1 is preferably an organic group with 1 to 20 carbon atoms.

Most preferred are imidazolium cations of formula I; in particular imidazolium cations where R and R1 are each an organic radical having from 1 to 20 carbon atoms and R2, R3, and R4 are each an H atom or an organic radical having from 1 to 20 carbon atoms.

In the imidazolium cation of formula I, preference is given to R and R1 each being, independently of one another, an organic radical having from 1 to 10 carbon atoms. In particular, R and R1 are each an aliphatic radical, in particular an aliphatic radical without further heteroatoms, e.g. an alkyl group. Particular preference is given to R and R1 each being, independently of one another, a C1-C10- or C1-C4-alkyl group.

In the imidazolium cation of formula I, preference is given to R2, R3 and R4 each being, independently of one another, an H atom or an organic radical having from 1 to 10 carbon atoms; in particular R2, R3 and R4 are each an H atom or an aliphatic radical. Particular preference is given to R2, R3 and R4 each being, independently of one another, an H atom or an alkyl group; in particular R2, R3 and R4 are each, independently of one another, an H atom or a C1-C4-alkyl group. Very particular preference is given to R2, R3 and R4 each being an H atom.

The ionic liquids can comprise inorganic or organic anions. Such anions are mentioned, for example, in the abovementioned WO 03/029329, WO 2007/076979, WO 2006/000197 and WO 2007/128268.

Possible anions are in particular anions from the following groups:

The group of halides and halogen-comprising compounds of the formulae:

F$^-$, Cl$^-$, Br$^-$, I$^-$, BF$_4^-$, PF$_6^-$, AlCl$_4^-$, Al$_2$Cl$_7^-$, Al$_3$Cl$_{10}^-$, AlBr$_4^-$, FeCl$_4^-$, BCl$_4^-$, SbF$_6^-$, AsF$_6^-$, ZnCl$^{3-}$, SnCl$_3^-$, CuCl$_2^-$, CF$_3$SO$_3^-$, (CF$_3$SO$_3$)$_2$N$^-$, CF$_3$CO$_2^-$, CCl$_3$CO$_2^-$, CN$^-$, SCN$^-$, OCN$^-$, NO$^{2-}$, NO$^{3-}$, N(CN)$^-$;

the group of sulfates, sulfites and sulfonates of the general formulae:
$SO_4^{2-}$, $HSO_4^-$, $SO_3^{2-}$, $HSO_3^-$, $R^aSO_3^-$, $R^aSO_3^-$;
the group of phosphates of the general formulae:
$PO_4^{3-}$, $HPO_4^{2-}$, $H_2PO_4^-$, $R^aPO_4^{2-}$, $HR^aPO_4^-$, $R^aR^bPO_4^-$;
The group of phosphonates and phosphinates of the general formulae:
$R^aHPO_3^-$, $R^aR^bPO_2$, $R^aR^bPO_3^-$;
the group of phosphites of the general formulae:
$PO_3^{3-}$, $HPO_3^{2-}$, $H_2PO_3^-$, $R^aPO_3^{2-}$, $R^aHPO_3^-$, $R^aR^bPO_3^-$;
the group of phosphonites and phospinites of the general formulae:
$R^aR^bPO_2^-$, $R^aHPO_2^-$, $R^aR^bPO^-$, $R^aHPO^-$;
the group of carboxylates of the general formula:
$R^aCOO^-$;
the group of borates of the general formulae:
$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO4)^-$;
the group of boronates of the general formulae:
$R^aBO_2^{2-}$, $R^aR^bBO^-$;
the group of carbonates and carbonic esters of the general formulae:
$HCO_3^-$, $CO_3^{2-}$, $R^aCO_3^-$;
the group of silicates and silicic esters of the general formulae:
$SiO_4^{4-}$, $HSiO_4^{3-}$, $H_2SiO_4^{2-}$, $H_3SiO_4^-$, $R^aSiO_4^{3-}$, $R^aR^b SiO_4^{2-}$, $R^aR^bR^cSiO_4^-$, $HR^aSiO_4^{2-}$, $H_2R^aSiO_4^-$, $HR^aR^b SiO_4^-$;
the group of alkylsilane and arylsilane salts of the general formulae:
$R^aSiO_3^{3-}$, $R^aR^bSiO_2^{2-}$, $R^aR^bR^cSiO^-$, $R^aR^bR^cSiO_3^-$, $R^aR^b R^cSiO_2^-$, $R^aR^bSiO_3^{2-}$;
the group of carboximides, bis(sulfonyl)imides and sulfonylimides of the general formulae:

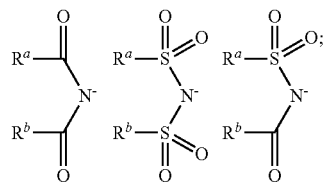

the group of methides of the general formula:

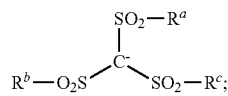

the group of alkoxides and aryloxides of the general formula:
$R^aO^-$;
the group of halometalates of the general formula:
$[M_rHal_t]^{s-}$,
where M is a metal and Hal is fluorine, chlorine, bromine or iodine, r and t are positive integers and indicate the stoichiometry of the complex and s is a positive integer and indicates the charge on the complex;
the group of sulfides, hydrogensulfides, polysulfides, hydrogen polysulfides and thiolates of the general formulae:
$S^{2-}$, $HS^-$, $[S_v]^{2-}$, $[HS_v]^-$, $[R^aS]^-$,
where v is a positive integer from 2 to 10; and
the group of complex metal ions such as $Fe(CN)_6^{3-}$, $Fe(CN)_6^{4-}$, $MnO_4^-$, $Fe(CO)_4^-$.

In the above anions, $R^a$, $R^b$, $R^c$ and $R^d$ are each independently of one another,
hydrogen;
$C_1$-$C_{30}$-alkyl and aryl-, heteroaryl-, cycloalkyl-, halogen-, hydroxy-, amino-, carboxy-, formyl-, —O—, —CO—, —CO—O— or —CO—N< substituted derivatives thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ where $q \leq 30$, $0 \leq a \leq q$ and $b=0$ or 1 (for example $CF_3$, $C_2F_5$, $CH_2CH_2$—$C_{(q-2)F2(q-2)+1}$, $C_6H_{13}$, $C_8H_{17}$, $C_{10}F_{21}$, $C_{12}F_{25}$);
$C_3$-$C_{12}$-cycloalkyl and aryl-, heteroaryl-, cycloalkyl-, halogen-, hydroxy-, amino-, carboxy-, formyl-, —O—, —CO— or —CO—O-substituted derivatives thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ where $q \leq 30$, $0 \leq a \leq q$ and $b=0$ or 1;
$C_2$-$C_{30}$-alkenyl and aryl-, heteroaryl-, cycloalkyl-, halogen-, hydroxy-, amino-, carboxy-, formyl-, —O—, —CO— or —CO—O-substituted derivatives thereof, for example 2-propenyl, 3-butenyl, cis-2-butenyl, trans-2-butenyl or $C_qF_{2(q-a)-(1-b)}H_{2a-b}$ where $q \leq 30$, $0 \leq a \leq q$ and $b=0$ or 1;
$C_3$-$C_{12}$-cycloalkenyl and aryl-, heteroaryl-, cycloalkyl-, halogen-, hydroxy-, amino-, carboxy-, formyl-, —O—, —CO— or —CO—O-substituted derivatives thereof, for example 3-cyclopentenyl, 2-cyclohexenyl, 3-cyclohexenyl, 2,5-cyclohexadienyl or $C_qF_{2(q-a)-3(1-b)}H_{2a-3b}$ where $q \leq 30$, $0 \leq a \leq q$ and $b=0$ or 1;
Aryl or heteroaryl having from 2 to 30 carbon atoms and alkyl-, aryl-, heteroaryl-, cycloalkyl-, halogen-, hydroxy-, amino-, carboxy-, formyl-, —O—, —CO— or —CO—O-substituted derivatives thereof, for example phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ where $0 \leq a \leq 5$; or two radicals form an unsaturated, saturated or aromatic ring which is optionally substituted by functional groups, aryl, alkyl, aryloxy, alkyloxy, halogen, heteroatoms and/or heterocycles and optionally interrupted by one or more oxygen and/or sulfur atoms and/or one or more substituted or unsubstituted imino groups.

In the above anions, preference is given to $R^a$, $R^b$, $R^c$ and $R^d$ each being, independently of one another, a hydrogen atom or a C1-C12-alkyl group.

Anions which may be mentioned are, for example, chloride; bromide; iodide; thiocyanate; hexafluorophosphate; trifluoromethanesulfonate; methanesulfonate; the carboxylates, in particular formate; acetate; mandelate; nitrate; nitrite; trifluoroacetate; sulfate; hydrogensulfate; methylsulfate; ethylsulfate; 1-propylsulfate; 1-butylsulfate; 1-hexylsulfate; 1-octylsulfate; phosphate; dihydrogenphosphate; hydrogenphosphate; C1-C4-dialkylphosphates; propionate; tetrachloroaluminate; $Al_2Cl_7^-$; chlorozincate; chloroferrate; bis(trifluoromethylsulfonyl)imide; bis(pentafluoroethylsulfonyl)imide; bis(methylsulfonyl)imide; bis(p-toluenesulfonyl)imide; tris(trifluoromethylsulfonyl)-methide; bis(pentafluoroethylsulfonyl)methide; p-toluenesulfonate; tetracarbonylcobaltate; dimethylene glycol monomethyl ether sulfate; oleate; stearate; acrylate; methacrylate; maleate; hydrogencitrate; vinylphosphonate; bis(penta fluoroethyl)phosphinate; borates such as bis[salicylato(2-)]borate, bis [oxalato(2-)]borate, bis[1,2-benzenediolato(2)-O,O']borate, tetracyanoborate, tetrafluoroborate; dicyanamide; tris(pentafluoroethyl)trifluorophosphate; tris(heptafluoropropyl)trifluorophosphate, cyclic arylphosphates such as catecholphosphate $(C_6H_4O_2)P(O)O^-$ and chlorocobaltate.

Particularly preferred anions are anions from the group consisting of
alkylsulfates
$R^aOSO_3^-$,
where $R^a$ is a C1-C12-alkyl group, preferably a C1-C6-alkyl group,
alkylsulfonates
$R^aSO_3^-$;
where $R^a$ is a C1-C12 alkyl group, preferably a C1-C6-alkyl group,
halides, in particular chloride and bromide, and
pseudohalides, such as thiocyanate, dicyanamide,
carboxylates $R^aCOO^-$;
where $R^a$ is a C1-C20-alkyl group, preferably a C1-C8-alkyl group, in particular acetate,
phosphates,
in particular dialkylphosphates of the formula $R^aR^bPO_4^-$, where $R^a$ and $R^b$ are each, independently of one another, C1-C6-alkyl groups; in particular, $R^a$ and $R^b$ are the same alkyl group, for example dimethylphosphate and diethylphosphate,
and phosphonates, in particular monoalkylphosphonic esters of the formula $R^aR^bPO_3^-$, where $R^a$ and $R^b$ are each, independently of one another, a C1-C6-alkyl group.

Very particularly preferred anions are:
chloride, bromide, hydrogensulfate, tetrachloroaluminate, thiocyanate, dicyanamide, methylsulfate, ethylsulfate, methanesulfonate, formate, acetate, dimethylphosphate, diethylphosphate, p-toluenesulfonate, tetrafluoroborate and hexafluorophosphate, methylmethylphosphonate (methylester of methylphosphonate).

Particularly preferred ionic liquids consist exclusively of an organic cation together with one of the anions mentioned.

Most preferred are imdazolium salts with an imidazolium cation according to formula I and one of the above anions, specifically one of the particularly preferred anions, specifically acetate, chloride, dimethylphosphate or diethylphosphate or methylmethylphosphonate. Most preferred is acetate or chloride.

The molecular weight of the ionic liquid is preferably less than 2000 g/mol, particularly preferably less than 1500 g/mol, particularly preferably less than 1000 g/mol and very particularly preferably less than 750 g/mol; in a particular embodiment, the molecular weight is in the range from 100 to 750 g/mol or in the range from 100 to 500 g/mol.
Preparation of the Solution In the process of the invention, a solution of the poly- or oligosaccharide, preferably cellulose, in the solvent system is prepared. The concentration of the poly- or oligosaccharide can be varied within a wide range. It is usually in the range from 0.1 to 50% by weight, based on the total weight of the solution, preferably from 0.2 to 40% by weight, particularly preferably from 0.3 to 30% by weight and very particularly preferably from 0.5 to 20% by weight.

This dissolution procedure can be carried out at room temperature or with heating, but above the melting point or softening temperature of the ionic liquid, usually at a temperature of from 0 to 200° C., preferably from 20 to 180° C., particularly preferably from 50 to 150° C. However, it is also possible to accelerate dissolution by intensive stirring or mixing or by introduction of microwave or ultrasonic energy or by a combination of these. If a solvent system comprising ionic liquids and non-ionic solvents is used, the poly- or oligosaccharide may be dissolved in the ionic liquid first and the non-ionic solvent be added thereafter.
To step B)

In step B) the poly- or oligosaccharides, preferably cellulose, are reacted with a chlorinating agent.

The chlorinating agent may, for example, be added as such or in form of a solution in an appropriate solvent to the solution obtained after step A).

Usual chlorinating agents may be used, for example thionyl chloride, methanesulfonyl chloride, chlorodimethyliminium chloride, phosphoryl chloride or para-toluenesulfonic chloride.

A preferred chlorinating agent is thionyl chloride.

The chlorinating agent should be added at least in amounts to achieve the desired degree of substitution.

The degree of substitution (DS) of poly- or oligosaccharides is the average number of hydroxyl groups per six-ring unit of the polysaccharides or oligosaccharides substituted by a chloride.

The degree of substitution (DS) of a given chlorinate cellulose is defined as the average number of substituted hydroxyl groups per anhydroglucose unit (AGU).

DS is determined from the chlorine content detected in elemental analysis.

The chlorinated polysaccharides or oligosaccharides obtained by the process of the invention preferably have a degree of substitution (DS) of at least 0.5.

There are 3 hydroxyl groups in the AGU of cellulose and thus the theoretical maximum of the DS in chlorinated cellulose is 3.0. The first hydroxyl group in cellulose to be substituted by a chlorine atom will usually be the hydroxyl of the hydroxyl-methylene-group.

A preferred DS of the chlorinated cellulose obtained by the process of the invention is 0.5 to 3, more preferred is a DS of 0.8 to 3. Suitable chlorinated cellulose obtained by the process of the instant invention may have, for example a DS of 0.5 to 1.5 or from 0.8 to 1.5.

With the process of the invention a DS in chlorinated cellulose of at least 1.0 can be easily achieved.

The chlorinating agent may be added in excess, which means that more chlorinating agent may be added than required for the maximum DS. Non-reacted chlorinating agents may be removed by usual means, thionyl chloride may, for example, be removed by evaporation.

The chlorinating agent, in particular thionyl chloride, does not only effect the substitution of the hydroxyl group by a chlorine atom but leads also to a degradation of the poly- or oligosaccharides, in particular cellulose. This degradation is caused by the fact that the chlorinating agent hydrolyzes the oxygen bridging between the repeating units of the main chain of the oligo- or polysaccharide (β-1,4-glycosidic bonds.

Thus the process of the instant invention is in fact also a process for chlorinating and hydrolyzing poly- or oligosaccharides.

Hence the obtained chlorinated poly- or oligosaccharides, for example chlorinated cellulose, preferably have a degree of polymerization (DP) which is lower less than the DP of the non-chlorinated polysaccharides or oligosaccharides, in particular the DP of the obtained chlorinated poly- or oligosaccharides may be less than 90%, preferably less than 80%, more preferably less than 50%, and most preferably less than 20 or even less than 10% of the DP of the non chlorinated starting material.

Starting with preferred cellulose which may have a DP of 50 to 1000, more preferably of 100 to 800 (see above) degraded chlorinated cellulose may be obtained with a DP of less than 100, for example with a DP of 5 to 100, or of 10 to 100, or of 10 to 50.

Thus with the process of the invention a chlorinated cellulose is obtained which may have, for example, a DS of 0.5 to 3, specifically of 0.5 to 1.5 and a DP of 10 to 100, specifically of 10 to 50. Most preferred is chlorinated cellulose with a DS of 0.5 to 1.5 and a DP of 5 to 100 or chlorinated cellulose of a DS of 0.8 to 1.5 and a DP of 10 to 50.

During the chlorinating reaction the reaction mixture is preferably kept at an elevated temperature; the temperature may be for example from 30 to 150° C., more preferably from 80 to 130° C. at ambient pressure (1 bar).

In general, the reaction is carried out in air. However, it is also possible to carry it out under inert gas, i.e., for example, under $N_2$, a noble gas or a mixture thereof.

Temperature and reaction time may be selected to achieve the desired degree of DS and DP. For the degradation no further additives like acids or nucleophiles (see WO 2007/101811, degradation by the use of acids or WO 2007/101813, degradation by nucleophils) are required. Also the use of a base is not required. In a preferred embodiment the chlorination is performed in absence of an additional base.

As a product of the process solutions are obtained which comprise ionic liquid and chlorinated polysaccharides or oligosaccharides.

The chlorinated polysaccharides or oligosaccharides may be isolated from such solutions, if desired, by usual means.

The chlorinated polysaccharides or oligosaccharides may for example be obtained from the solution by adding a coagulating solvent (non-solvent for chlorinated polysaccharides or oligosaccharides) or other coagulating agent, in particular a base or basic salt, for example ammonia or a solution comprising $NH_4OH$ and separating the coagulated chlorinated polysaccharides or oligosaccharides from the solvent system. Depending on the way of mixing coagulating solvent and reaction mixture, different chlorinated species can be obtained. For example, predominantly mono chlorinated species are obtained by pouring the coagulation solvent into the reaction mixture. On the other hand, predominantly dichlorinated species are obtained by pouring the reaction mixture into the coagulation solvent.

The isolated chlorinated polysaccharides or oligosaccharides, in particular chlorinated cellulose, may be obtained in specific shapes. If desired it can be obtained in form of fibers, films or pearls, depending on the specific conditions under which the chlorinated polysaccharides or oligosaccharides are precipitated.

The isolated or precipitated chlorinated polysaccharides or oligosaccharides could be dried to remove residual solvent.

The solution of polysaccharides or oligosaccharides or the polysaccharides or oligosaccharides isolated from such solution are useful for various technical applications. Chlorinated cellulose of low DP (oligomers) could be used as intermediates to produce cationic, amphiphilic, nonionic, and anionic cellulose oligomers which also have a variety of possible technical applications.

One embodiment of this invention is a process of modifying the chlorinated species by at least partially substituting chlorine by bisphenol A. The new substituent is given by the following formula:

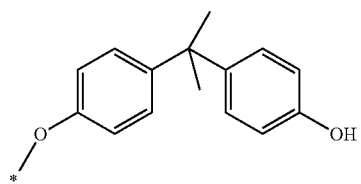 [SMILES: COc1ccc(C(C)(C)c2ccc(O)cc2)cc1]

wherein * represents the binding site to the cellulose C6 carbon ($—CH_2—$).

EXAMPLES

General Procedure

Cellulose (microcrystalline cellulose (Avicel®, DP=430) was dissolved in ionic liquid, 1-butyl-3-methyl imidazolium chloride (BMIMCl) by heating at 100° C. for 2 hours. Dioxan was added as a co-solvent. The reaction was cooled to 60° C. and thionyl chloride (5 eq.) was added. The mixture was stirred at 60° C. for 2 hours after which the excess of thionyl chloride was removed in vacuo. After which, the mixture was cooled down to 5° C. and $NH_4OH$ was added. Precipitation was filtered off and washed with warm water and dried in vacuum oven at 65° C. DP=26 DS=0.8-1.13. Due to the insoluble nature of the dried product, the analysis was done by CP-MAS NMR (solid state NMR), IR, GPC and elemental analysis.

Reaction Scheme:

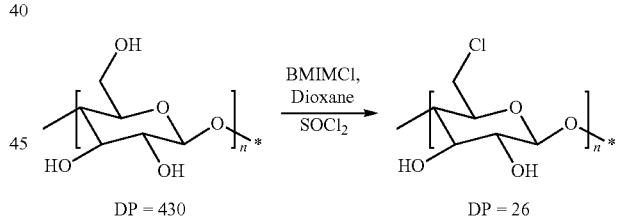

In further experiments (examples 2 and 3) the amount of cellulose was varied, temperature (60° C.), time (2 h) and amount of thionyl chloride (5 eq.) were kept constant. The results of all examples are shown in the Table:

| Example | Starting Cellulose (g) | Yield (g) | Yield (%) | DS | DP |
|---|---|---|---|---|---|
| 1 | 4.36* | 2.8 | 58 | 1.02 | 26 |
| 2 | 8.72 | 8.9 | 91 | 0.8 | 26 |
| 3 | 8.72 | 10 | 100 | 1.13 | 24 |

Analysis of the Obtained Chlorinated Cellulose

Chlorinated cellulose oligomers suffer from the poor solubility and hence, could not be analyzed by solution state NMR. IR showed the typical $CH_2—Cl$ vibration at 1428 $cm^{-1}$ and C—Cl band at 751 $cm^{-1}$.

CP-MAS NMR Spectroscopy

FIG. 1. Structure of anhydroglucose unit (AGU) of chlorocellulose showing numbering of carbon atoms.

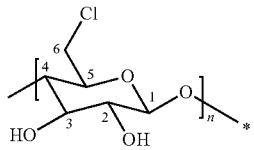

C-6 chlorination can be clearly seen in CP-MAS NMR (solid state NMR) spectrum as a shift in a chemical shift for C-6 carbon. C6-Cl signal is observed at 40 ppm whereas unsubstituted C-6 (C6-OH) has a chemical shift at around 60 ppm. Dichlorination (C-6 and C-1) was seen as a shifted chemical signal of C-1 from 104 ppm to 97 ppm (C-1 chlorination) and C-6 chlorination at 40 ppm.

Crystallinity of cellulose can be estimated by interpreting the C-4 signal. Two signals for C-4 are observed in the spectrum of native cellulose. This means that there are both amorphous and crystalline cellulose present in the structure. After homogeneous chemical modification in which cellulose is fully dissolved in a given solvent, the crystallinity of cellulose vanishes leaving mostly the less ordered (amorphous) cellulose derivative as a product. In addition, the signal at 81.7 ppm has been stated to originate from less ordered carbohydrates such as cellulose oligomers. This can be seen in a case of chlorocellulose oligomer for which only a less ordered (amorphous) C-4 signal is detected.

The invention claimed is:

1. A process for chlorinating a polysaccharide or an oligosaccharide, which comprises
    A) dissolving the polysaccharide or oligosaccharide in a solvent system which comprises at least one ionic liquid and dioxan as a co-solvent; and
    B) reacting the polysaccharide or oligosaccharide with a chlorinating agent;
    wherein the at least one ionic liquid has a cation selected from an imidazolium cation of formula I

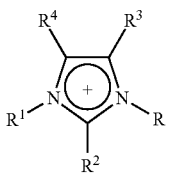

wherein the radicals have the following meaning:
    R is an organic group with 1 to 20 carbon atoms and
    $R^1$ to $R^4$ are, independently from each other, a hydrogen atom or an organic group with 1 to 20 carbon atoms.

2. The process according to claim 1, wherein the polysaccharide or oligosaccharide is cellulose, hemicellulose or chemically modified cellulose.

3. The process according to claim 2, wherein chlorinated cellulose is obtained with a DS of 0.5 to 3 and a DP of 10 to 100.

4. The process according to claim 1, wherein, the chlorinated polysaccharide or oligosaccharide is obtained from the solution by adding a coagulating solvent (non-solvent for chlorinated polysaccharides or oligosaccharides) or other coagulating agent and separating the coagulated chlorinated polysaccharides or oligosaccharides from the mixture.

5. The process according to claim 1, wherein the content of ionic liquids in the mixture of solvents is at least 20% by weight.

6. The process according to claim 1, wherein the chlorinating agent is thionyl chloride.

7. The process according to claim 1, wherein during chorination the temperature is 30 to 150° C.

8. The process according to claim 1, wherein the obtained chlorinated polysaccharide or oligosaccharide has a degree of substitution (DS) of at least 0.5; DS being defined as the average number of hydroxyl groups per six-ring unit of the polysaccharides or oligosaccharides substituted by a chloride.

9. The process according to claim 1, wherein the obtained chlorinated polysaccharide or oligosaccharide has a degree of polymerization (DP) which is less than the DP of the non-chlorinated polysaccharides or oligosaccharides.

10. The process according to claim 1, wherein the solvent system comprises 1-butyl-3-methyl imidazolium chloride.

* * * * *